US007774531B1

(12) United States Patent
Karlsson (10) Patent No.: US 7,774,531 B1
(45) Date of Patent: Aug. 10, 2010

(54) ALLOCATING PROCESSOR RESOURCES DURING SPECULATIVE EXECUTION USING A TEMPORAL ORDERING POLICY

(75) Inventor: Martin Karlsson, Uppsala (SE)

(73) Assignee: Oracle America, Inc., Redwood Shores, CA (US)

( * ) Notice: Subject to any disclaimer, the term of this patent is extended or adjusted under 35 U.S.C. 154(b) by 1081 days.

(21) Appl. No.: 11/226,614

(22) Filed: Sep. 13, 2005

(51) Int. Cl.
G06F 13/22 (2006.01)
G06F 13/28 (2006.01)
G06F 3/00 (2006.01)
G06F 5/00 (2006.01)
G06F 13/00 (2006.01)

(52) U.S. Cl. ............... 710/220; 710/28; 710/36; 710/46; 710/47; 710/107; 710/109

(58) Field of Classification Search ........... 710/220, 710/28, 36, 46, 47, 107, 109
See application file for complete search history.

(56) References Cited

U.S. PATENT DOCUMENTS

| 5,452,426 | A * | 9/1995 | Papworth et al. ............ 712/217 |
| 5,611,063 | A * | 3/1997 | Loper et al. ................. 712/205 |
| 6,535,973 | B1 * | 3/2003 | Cheong et al. .............. 712/218 |
| 6,640,315 | B1 * | 10/2003 | Hwu et al. .................... 714/17 |
| 6,854,048 | B1 * | 2/2005 | Dice ............................ 712/216 |
| 6,993,633 | B1 * | 1/2006 | Sakakibara et al. .......... 711/146 |
| 2003/0005266 | A1 * | 1/2003 | Akkary et al. ............... 712/220 |

* cited by examiner

Primary Examiner—Niketa I Patel
Assistant Examiner—Farley J Abad
(74) Attorney, Agent, or Firm—Park, Vaughan & Fleming LLP; Anthony P. Jones (57) ABSTRACT

One embodiment provides a system which uses a temporal ordering policy for allocation of limited processor resources. The system starts by executing instructions for a program during a normal-execution mode. Upon encountering a condition which causes the processor to enter a speculative-execution mode, the processor performs a checkpoint and commences execution of instructions in the speculative-execution mode. Upon encountering an instruction which requires the allocation of an instance of a limited processor resource during the execution of instructions in the speculative-execution mode, the processor checks a speculative-use indicator associated with each instance of the limited processor resource. Upon finding the speculative-use indicators asserted for all instances of the limited processor resource which are available to be allocated for the instruction, the processor aborts the instruction. On the other hand, upon finding the speculative-use indicator is deasserted for an instance of the limited processor resource which is available to be allocated for the instruction, the processor asserts the speculative-use indicator associated with the instance and executes the instruction.

22 Claims, 5 Drawing Sheets

ALLOCATING PROCESSOR RESOURCES DURING SPECULATIVE EXECUTION USING A TEMPORAL ORDERING POLICY

BACKGROUND

1. Field of the Invention

The present invention relates to techniques for improving the performance of computer systems. More specifically, the present invention relates to a method and apparatus for allocating processor resources, such as cache locations, during speculative execution using a temporal ordering policy.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

When a memory reference generates a cache miss, the subsequent access to level-two (L2) cache (or main memory) can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that can be used for register renaming purposes during out-of-order execution also limit the effective size of the issue queue.

Some processor designers have proposed using speculative execution to hide the cache-miss latency. For example, if the processor encounters a stall condition, such as a cache miss, instead of waiting for the cache miss to be resolved, the processor generates a checkpoint and enters a scout mode. In scout mode, instructions are speculatively executed to prefetch future loads, but results are not committed to the architectural state of the processor. When the stall condition is finally resolved, the system uses the checkpoint to resume execution in normal-execution mode from the instruction that originally encountered the stall condition. By allowing the processor to continue to perform prefetches during stall conditions, scout mode can significantly increase the amount of work the processor completes.

Unfortunately, proposed systems that use scout mode do not always achieve optimal performance. In fact, there are operating conditions during which much of the performance benefit of scout mode is lost. One such condition occurs in processors that generate the checkpoint at the launch instruction (the instruction that caused the processor to enter scout mode) before commencing execution in scout mode. With this type of processor, the launch instruction is re-executed upon returning to normal-execution mode from scout mode. The cache line required by the launch instruction is re-read as the launch instruction is re-executed. A "live-lock" occurs when the required cache line is evicted during scout mode execution before returning to normal-execution mode.

Figure 1A:
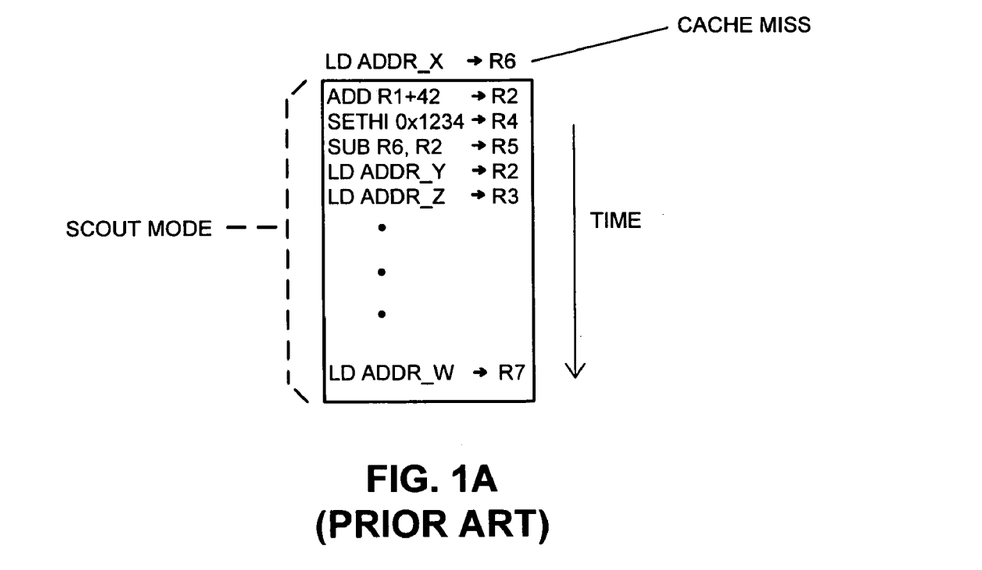
FIG. 1A illustrates a sequence of instructions that causes live-lock in a processor that supports speculative execution.

For example, FIG. 1A illustrates a sequence of instructions that causes live-lock in such a processor. Note that the examples in both FIG. 1A and FIG. 1B assume: (1) a 2-way set-associative L1 cache (although both examples scale to any N-way set-associative cache); (2) that all the load instructions in these examples miss in the L1 cache, requiring a request to be sent to the L2 cache; and (3) that the addresses for the load instructions in these examples are associated with the same set within the L1 cache.

In FIG. 1A, the processor first executes LD ADDR_X, which misses in the L1 cache, causing a request for the cache line to be sent to the L2 cache. In order to avoid stalling, the processor generates a checkpoint at the LD ADDR_X instruction and commences execution in scout mode. As the processor executes the subsequent instructions in scout mode, the processor executes LD ADDR_Y, then LD ADDR_Z, and eventually LD ADDR_W. Because these load instructions all miss in the L1 cache, the processor generates a prefetch for each of the instructions. A short time after the processor sends the final prefetch (for LD ADDR_W) to the L2 cache, the cache line requested from the L2 cache for LD ADDR_X returns. The return of this cache line clears the stall condition, so the processor returns to the checkpoint to resume the execution of instructions in normal-execution mode. Unfortunately, before the processor can request the cache line required by LD ADDR_X after returning to normal-execution mode, the cache line is evicted by the return of one of the later scout mode prefetches (such as the prefetch for LD ADDR_Y). The cache line request for LD ADDR_X therefore misses in the L1 cache for a second time—again causing the processor to send a request to the L2 cache and commence execution in scout mode. This cycle can repeat indefinitely, trapping the processor in live-lock.

Figure 1B:
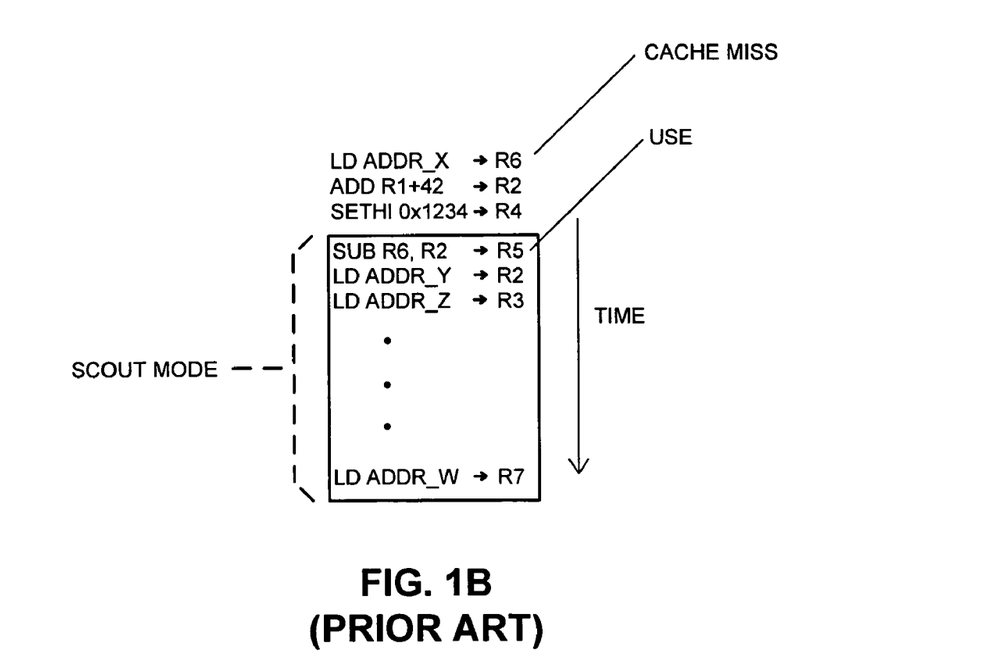
FIG. 1B illustrates the "early-prefetch eviction" problem in a processor that supports speculative execution.

Another sub-optimal scout mode operating condition occurs when a processor runs for an extended time in scout mode, causing the prefetches sent early in scout mode to be evicted from the cache by later prefetches. FIG. 1B illustrates this "early-prefetch eviction" problem in a scout mode processor. Note that in FIG. 1B the processor commences execution in scout mode on the "use" of the result of the launch instruction, instead of on the launch instruction itself, but this example also applies in a processor that generates the checkpoint at the launch instruction.

In FIG. 1B, the processor first executes LD ADDR_X, which misses in the in the L1 cache, causing a request for the cache line to be sent to the L2 cache. The processor then continues to execute instructions in normal-execution mode until encountering the "SUB R6, R2" instruction, the first "use" of R6. At this instruction, the processor generates a checkpoint and commences execution in scout mode. As the processor executes a number of instructions in scout mode, the processor executes LD ADDR_Y, then LD ADDR_Z, and finally LD ADDR_W. Because all these load instructions miss in the L1 cache, the processor generates a prefetch for each of them. As these prefetches return, the later prefetches begin to overwrite the earlier prefetches. Consequently, when the processor resumes operation in normal-execution mode and attempts to load the prefetched cache lines, the lines which were prefetched early in scout mode have been evicted from the cache. The processor must then request these cache lines again from the L2 cache—repeating the work performed during scout mode.

Although the above example applies to cache lines, other processor state information can be subject to the same problem. For example, a branch prediction in the branch prediction table can be updated early in scout mode and this update can be overwritten by a later scout mode instruction.

Hence, what is needed is a method and an apparatus for avoiding the above-described problems during operation in speculative-execution mode.

SUMMARY

One embodiment provides a system which uses a temporal ordering policy for allocation of limited processor resources. The system starts by executing instructions for a program during a normal-execution mode. Upon encountering a condition which causes the processor to enter a speculative-execution mode, the processor performs a checkpoint and commences execution of instructions in the speculative-execution mode. Upon encountering an instruction which requires the allocation of an instance of a limited processor resource during the execution of instructions in the speculative-execution mode, the processor checks a speculative-use indicator associated with each instance of the limited processor resource. Upon finding the speculative-use indicators asserted for all instances of the limited processor resource which are available to be allocated for the instruction, the processor aborts the instruction. On the other hand, upon finding the speculative-use indicator deasserted for an instance of the limited processor resource which is available to be allocated for the instruction, the processor asserts the speculative-use indicator associated with the instance and executes the instruction.

In a variation of this embodiment, the limited processor resource includes at least one of a location for a cache line within a cache, an entry for a branch prediction in a branch prediction table; or an entry in a translation look-aside buffer.

In a variation of this embodiment, the speculative-use indicators are all deasserted when the processor leaves speculative-execution mode.

In a variation of this embodiment, the speculative-use indicators are all deasserted when the processor enters speculative-execution mode.

In a further variation, the speculative-use indicator for each limited processor resource is ignored after the processor returns to normal-execution mode from speculative-execution mode.

In a further variation, the speculative-use indicator for each limited processor resource is deasserted as the limited processor resource is used after the processor returns to normal-execution mode from speculative-execution mode.

In a variation of this embodiment, the processor asserts the speculative-use indicator for an instance of the limited processor resource associated with an instruction that caused the entry into speculative-execution, and does not assert the speculative-use indicator for other instances of the limited processor resource.

In a variation of this embodiment, the processor uses a unique identifier as a speculative-use indicator.

In a further variation, the unique identifier is at least one of a count variable or an identifier which identifies the instruction which requested the allocation of the limited processor resource.

In a further variation, the processor deasserts a selection of the speculative-use indicators using the unique identifier to select the speculative-use indicators for deassertion.

In a variation of this embodiment, the processor asserts a speculative-use indicator for a location in a cache following a hit on the location in the cache during the execution of instructions in speculative-execution mode.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In one embodiment of the present invention, processor resources are circuit structures, memory locations, and other resources used by the processor to facilitate the execution of instructions. For example, processor resources include both on-processor resources such as branch predictions within the branch prediction table and off-processor resources such as locations for cache lines in a cache.

Processor

Figure 2A:
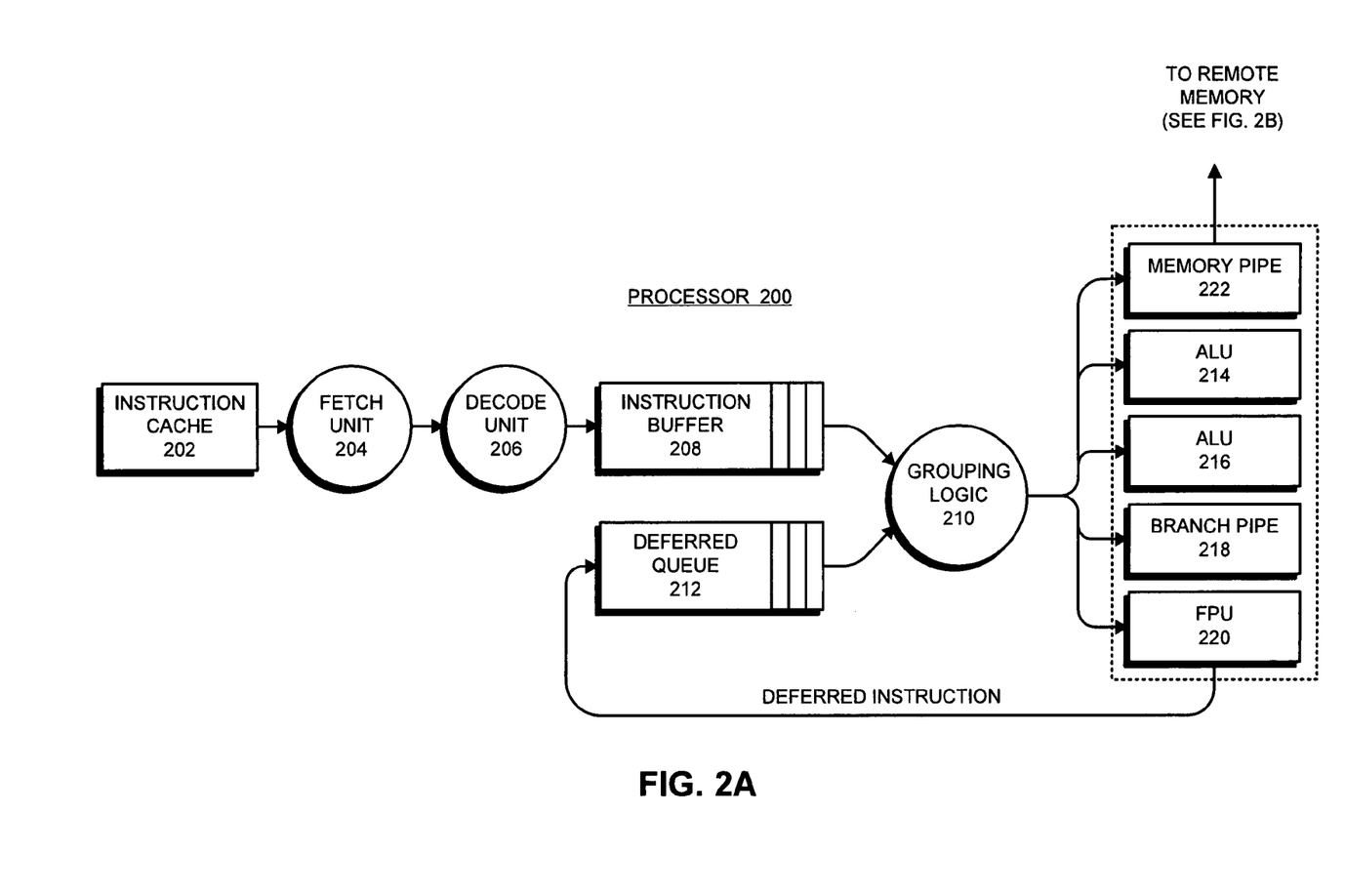
FIG. 2A illustrates the design of a processor that supports speculative execution in accordance with an embodiment of the present invention.

FIG. 2A illustrates the design of a processor that supports speculative execution in accordance with an embodiment of the present invention. Processor 200 can generally include any type of processor, including, but not limited to, a microprocessor, a mainframe computer, a digital signal processor, a personal organizer, a device controller and a computational engine within an appliance. As is illustrated in FIG. 2, processor 200 includes instruction cache 202, fetch unit 204, decode unit 206, instruction buffer 208, deferred queue 212, grouping logic 210, memory 213, arithmetic logic unit (ALU) 214, ALU 216, branch pipe 218, floating point unit 220, and memory pipe 222.

During operation, fetch unit 204 retrieves instructions to be executed from instruction cache 202, and feeds these instructions into decode unit 206. Decode unit 206 forwards the instructions to be executed into instruction buffer 208, which is organized as a FIFO buffer. Instruction buffer 208 feeds instructions in program order into grouping logic 210, which groups instructions together and sends them to execution units, including memory pipe 222, ALU 214, ALU 216, branch pipe 218 (which resolves conditional branch computations), and floating point unit 220.

If an instruction cannot be executed due to an unresolved data dependency, such as an operand that has not returned from a load operation, the system defers execution of the instruction and moves the instruction into deferred queue 212. Note that like instruction buffer 208, deferred queue 212 is also organized as a FIFO buffer.

When the data dependency is eventually resolved, instructions from deferred queue 212 are executed in program order with respect to other deferred instructions, but not with respect to other previously executed non-deferred instructions. This process is described in more detail below with reference to FIG. 3.

Memory Hierarchy

Figure 2B:
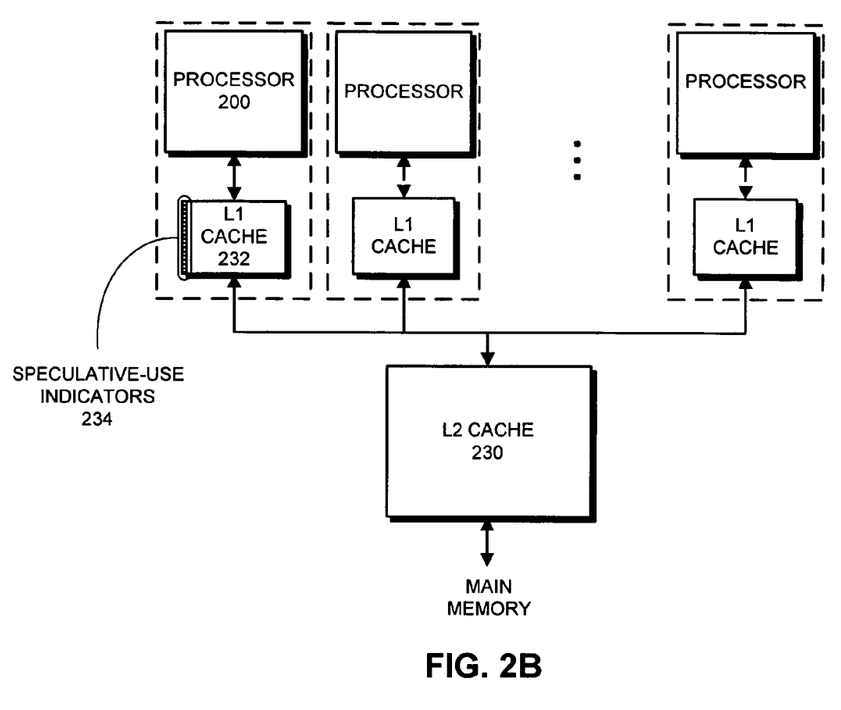
FIG. 2B illustrates a memory hierarchy for a computer system in accordance with an embodiment of the present invention.

FIG. 2B illustrates a memory hierarchy for a computer system in accordance with an embodiment of the present invention. Within the hierarchy, there may be multiple processors (or other memory consumers, such as system cards and peripherals) in a computer system, each with its own dedicated local (L1) cache, but which all share a system-level (L2) cache.

L1 cache 232 differs from a typical L1 cache because each cache line in L1 cache 232 has an associated "speculative-use" indicator 234. Processor 200 asserts a speculative-use indicator 234 while allocating a cache line for either of the returned value of a prefetch during scout mode or for the return value for the launch instruction (the instruction that caused processor 200 to enter scout mode). If a speculative-use indicator 234 is asserted for a cache line, processor 200 cannot allocate that cache line to hold the prefetched value for any subsequent instructions during scout mode.

By using the speculative-use indicators, processor 200 can prevent the data returned by early prefetches (which are used immediately on the return to normal-execution mode) from being overwritten by later prefetches. In addition, this technique can prevent processor 200 from entering a live-lock state by preventing the inadvertent eviction of the cache line by subsequent scout mode prefetches before processor 200 can return to normal-execution mode.

Note that speculative-use indicators 234 can also be used with system resources other than the L1 cache, such as a branch prediction table (BPT) or a translation lookaside buffer (TLB). For example, an adjustment to the prediction for a branch can be sheltered from subsequent scout mode updates by asserting a speculative-execution indicator 234 associated with the location in the branch prediction table. In addition, speculative-use indicators 234 can be propagated to higher levels in the memory hierarchy such as L2 cache 230.

In one embodiment, all speculative-use indicators 234 are deasserted as processor 200 leaves execution in scout mode. In an alternative embodiment, all speculative-use indicators 234 are deasserted as processor 200 enters execution in scout mode. For this embodiment, processor 200 can either deassert or ignore asserted speculative-use indicators as the individual speculative-use indicators are subsequently encountered in normal execution mode.

In one embodiment, processor 200 deasserts selected speculative-use indicators 234 in situations where processor 200 must make a jump in the progression of instructions in scout mode (such as when a branch has been mispredicted). Deasserting selected speculative-use indicators 234 can involve using a unique identifier as a speculative-use indicator 234, such as a counter or a memory address of a particular instruction. For example, the speculative-use indicator 234 for a cache line can be the count of the branch instructions observed during execution in scout mode. When a branch mispredict is discovered, all the speculative-use indicators 234 for cache lines asserted following the mispredicted branch can be identified by the value of the speculative-use indicator. Hence, the speculative-use indicators along the mispredicted branch can be selectively deasserted, allowing these cache lines to be updated by prefetches along subsequent correct branches.

In one embodiment, processor 200 only asserts a speculative-use indicator 234 for the cache line which is reserved for the returned value for the launch instruction (the "critical value"). By preventing subsequent scout mode instructions from allocating the cache line already allocated to the critical value, processor 200 guarantees that the cache line cannot be inadvertently evicted, thereby avoiding live-lock.

In one embodiment of the present invention, processor 200 uses a temporal ordering policy to allocate limited processor resources during scout mode. With this policy, when a limited processor resource is required by a requesting instruction, processor 200 allocates only instances of the limited processor resource which have not already been marked as allocated (the speculative-use indicator 234 is deasserted for the instance of the limited processor resource). If the requesting instruction cannot allocate an instance of the resource because the resource is completely allocated by an earlier scout mode instruction, processor 200 aborts the requesting instruction. The abortion of the requesting instruction can include the abortion of other outstanding actions by processor 200, such as the abortion of a L1-level fill of a speculatively requested cache line. Note that although the L1-level fill is aborted, a higher level cache fill, such as an L2-level fill, can be allowed to complete.

In one embodiment, processor 200 asserts the speculative-use indicator for a location in a cache following a hit on the location in the cache during the execution of instructions in speculative-execution mode. By asserting the speculative-use bits for these cache lines, processor 200 prevents subsequent scout mode instructions from evicting these cache lines. Consequently, when processor 200 returns to normal-execution mode from scout mode, these cache lines are still present in the cache.

Speculative-Execution State Diagram

Figure 3:
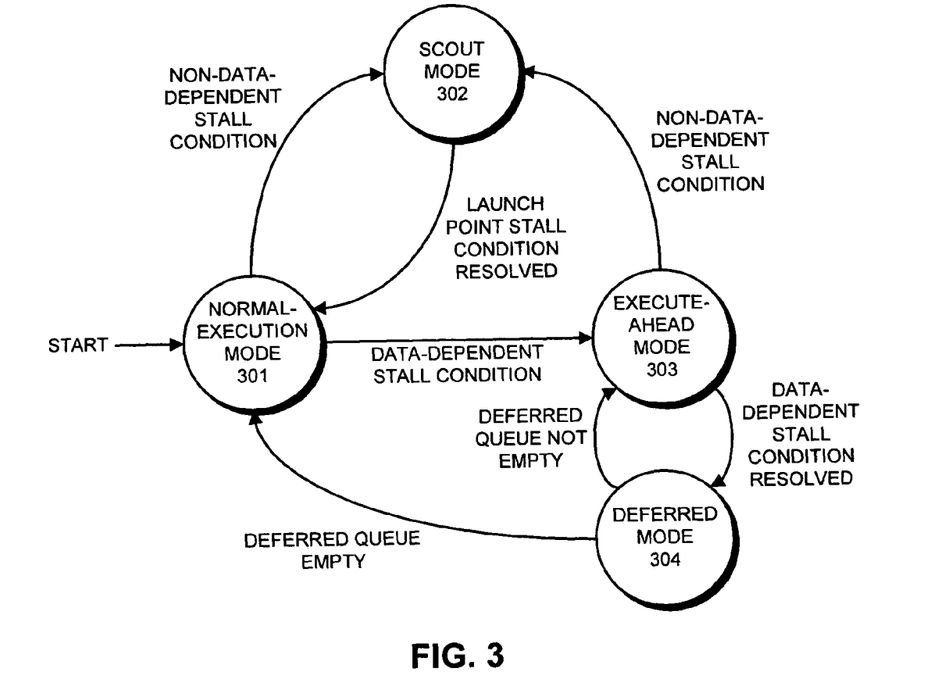
FIG. 3 presents a state diagram which includes a general depiction of execute-ahead mode, scout mode, and deferred mode in accordance with an embodiment of the present invention.

FIG. 3 presents a state diagram which includes a general depiction of execute-ahead mode 303, scout mode 302, and deferred mode 304 in accordance with an embodiment of the present invention. Note that each of these modes are types of speculative execution.

The system starts in normal-execution mode 301, wherein instructions are executed in program order as they are issued from instruction buffer 208 (see FIG. 2A).

Next, if an unresolved data dependency arises during execution of an instruction, the system moves to execute-ahead mode 303. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 303, the system generates a checkpoint that can be used, if necessary, to return execution of the process to the point where the unresolved data dependency was encountered; this point is referred to as the "launch point." (Note that generating the checkpoint involves saving the precise architectural state of processor 200 to facilitate subsequent recovery from exceptions that arise during execute-ahead mode 303 or deferred mode 304.)

The system also "defers" execution of the instruction that encountered the unresolved data dependency by storing the instruction in deferred queue 212.

While operating in execute-ahead mode 303, the system continues to execute instructions in program order as they are received from instruction buffer 208, and any instruction that cannot execute because of an unresolved data dependency is deferred (which involves storing the instruction in deferred queue 212).

During execute-ahead mode 303, if an unresolved data dependency is finally resolved, the system moves into deferred mode 304, wherein the system attempts to execute instructions from deferred queue 212 in program order. Note that the system attempts to execute these instructions in program order with respect to other deferred instructions in deferred queue 212, but not with respect to other previously executed non-deferred instructions (and not with respect to deferred instructions executed in previous passes through deferred queue 212). During this process, the system defers execution of deferred instructions that still cannot be executed because of unresolved data dependencies by placing these again-deferred instruction back into deferred queue 212. On the other hand, the system executes other instructions that can be executed in program order with respect to each other.

After the system completes a pass through deferred queue 212, if deferred queue 212 is empty, the system moves back into normal-execution mode 301. This may involve committing changes made during execute-ahead mode 303 and deferred mode 304 to the architectural state of processor 200, if such changes have not been already committed. The return to normal-execution mode can also involve throwing away the checkpoint generated when the system moved into execute-ahead mode 303 as well as checkpoints generated during execute-ahead mode.

On the other hand, if deferred queue 212 is not empty after the system completes a pass through deferred queue 212, the system returns to execute-ahead mode 303 to execute instructions from instruction buffer 208 from the point where the execute-ahead mode 303 left off.

If a non-data dependent stall condition (except for a load buffer full or store buffer full condition) arises while the system is in normal-execution mode 301 or execute-ahead mode 303, the system moves into scout mode 302. (This non-data-dependent stall condition can include: an atomic instruction such as a memory barrier operation; or a deferred queue full condition.) During scout mode 302, instructions are speculatively executed to prefetch future loads, but results are not committed to the architectural state of processor 200.

Scout mode 302 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 302.

Unfortunately, computational operations performed during scout mode 302 are not committed to the architectural state of processor 200, and hence need to be recomputed again upon returning to normal execution mode, which can require a large amount of computational work.

When the original "launch point" stall condition is finally resolved, the system moves back into normal-execution mode 301, and, in doing so, uses the previously generated checkpoint to resume execution from the launch point instruction that encountered the launch point stall condition. The launch point stall condition is the stall condition that originally caused the system to move out of normal-execution mode 301. For example, the launch point stall condition can be the data-dependent stall condition that caused the system to move from normal-execution mode 301 to execute-ahead mode 303, before moving to scout mode 302. Alternatively, the launch point stall condition can be the non-data-dependent stall condition that caused the system to move directly from normal-execution mode 301 to scout mode 302.

The Speculative-Use Indicator

Figure 4:
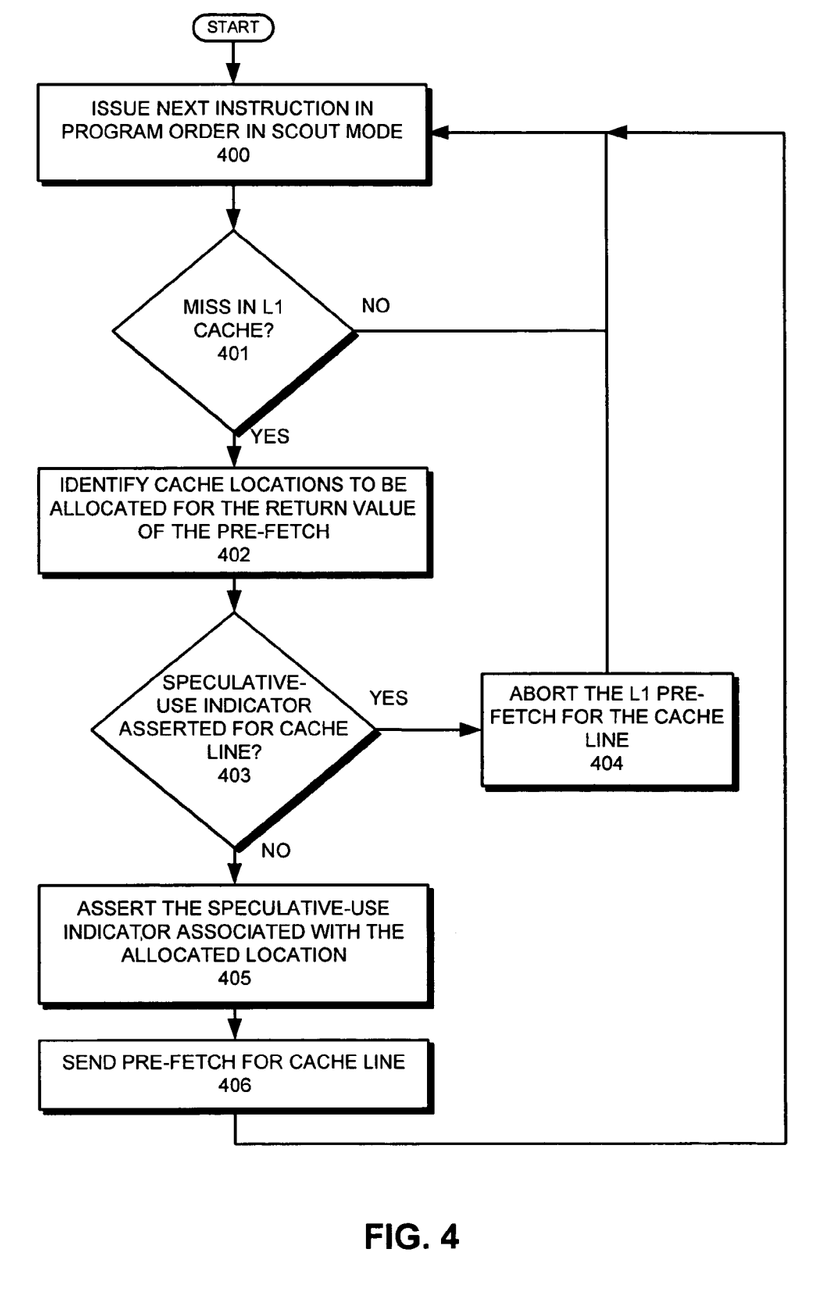
FIG. 4 presents a flow chart that illustrates the process of using speculative-use indicators in accordance with an embodiment of the present invention.

FIG. 4 presents a flow chart that illustrates the process of using speculative-use indicators 234 (see FIG. 2B) in accordance with an embodiment of the present invention.

The process starts at step 400 with processor 200 (see FIG. 2A) issuing an instruction in scout mode 302 (see FIG. 3). Unless the instruction causes a miss in the L1 cache (step 401), processor 200 returns to step 400 and issues the next instruction in scout mode 302.

Alternatively, if the instruction misses in the L1 cache (step 401), processor 200 determines which cache location should be allocated for the returned value of the prefetch (step 402). Processor 200 then determines if all the associated speculative-use indicators 234 are asserted for the locations for the cache line in the L1 cache (step 403). If so, all the cache line locations in the L1 cache are reserved for a prior prefetch. In this case, processor 200 aborts the current prefetch to the L1 (step 404). Aborting the current pre-fetch can involve transforming the pre-fetch to an L2 or higher cache level prefetch. Processor 200 then returns to step 400 to issue the next instruction in program order in scout mode.

If any of the associated speculative-use indicators 234 are deasserted, at least one cache line location in the L1 cache remains available to be reserved for scout-mode prefetches. Processor 200 therefore allocates a cache line for the return value by asserting the speculative-use indicator 234 associated with the cache line location in the L1 cache (step 405). Processor 200 then sends the prefetch request (step 406) and returns to step 400 to issue the next instruction in program order in scout mode.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   executing instructions in a normal-execution mode on a processor that supports speculative execution;
   upon encountering a condition which causes the processor to enter a speculative-execution mode, performing a checkpoint and commencing execution of instructions in the speculative-execution mode;
   upon encountering an instruction which requires the allocation of an instance of a limited processor resource during the execution of instructions in speculative-execution mode, checking a speculative-use indicator associated with each instance of the limited processor resource, wherein the speculative-use indicator is asserted for an instance of the limited processor resource when the instance of the limited processor resource is allocated during speculative execution;
   upon finding that the speculative-use indicators are asserted for all instances of the limited processor resource which are available to be allocated for the instruction, aborting the instruction; and otherwise, upon finding that the speculative-use indicator is deasserted for an instance of the limited processor resource which is available to be allocated for the instruction, asserting the speculative-use indicator associated with the instance and executing the instruction.

2. The method of claim 1, wherein a limited processor resource includes at least one of:
a location for a cache line within a cache;
an entry for a branch prediction in a branch prediction table; or
an entry in a translation look-aside buffer.

3. The method of claim 1, further comprising deasserting the speculative-use indicators upon exiting speculative-execution mode.

4. The method of claim 1, further comprising deasserting the speculative-use indicators upon entering speculative-execution mode.

5. The method of claim 4, further comprising either ignoring or de-asserting the speculative-use indicator associated with an instance of a limited processor resource as the instance of the limited processor resource is subsequently used.

6. The method of claim 1, further comprising asserting the speculative-use indicator for only the instance of the limited processor resource allocated to an instruction that caused an entry to the speculative-execution mode.

7. The method of claim 1, further comprising using a unique identifier as a speculative-use indicator.

8. The method of claim 7, wherein the unique identifier is at least one of a count variable or an identifier which identifies the instruction which requested the allocation of the instance of the limited processor resource.

9. The method of claim 7, further comprising deasserting a selection of the speculative-use indicators by using the unique identifier to select the speculative-use indicators for deassertion.

10. The method of claim 1, further comprising asserting a speculative-use indicator for a location in a cache following a hit on the location in the cache during the execution of instructions in speculative-execution mode.

11. An apparatus, comprising:
an execution mechanism on a processor that supports speculative execution;
wherein the execution mechanism is configured to execute instructions during a normal-execution mode;
upon encountering a condition which causes the processor to enter a speculative-execution mode, the execution mechanism is configured to perform a checkpoint and commence execution of instructions in the speculative-execution mode;
upon encountering an instruction which requires the allocation of an instance of a limited processor resource during the execution of instructions in speculative-execution mode, the execution mechanism is configured to check a speculative-use indicator associated with each instance of the limited processor resource, wherein the speculative-use indicator is asserted for an instance of the limited processor resource when the instance of the limited processor resource is allocated during speculative execution;
upon finding that the speculative-use indicators are asserted for all instances of the limited processor resource which are available to be allocated for the instruction, the execution mechanism is configured to abort the instruction; and otherwise, upon finding that the speculative-use indicator is deasserted for an instance of the limited processor resource which is available to be allocated for the instruction, the execution mechanism is configured to assert the speculative-use indicator associated with the instance and to execute the instruction.

12. The apparatus of claim 11, wherein the limited processor resource includes at least one of:
a location for a cache line within a cache;
an entry for a branch prediction in a branch prediction table; or
an entry in a translation look-aside buffer.

13. The apparatus of claim 11, wherein the execution mechanism is configured to deassert the speculative-use indicators when the processor exits a speculative-execution mode.

14. The apparatus of claim 11, wherein the execution mechanism is configured to deassert the speculative-use indicators when the processor enters a speculative-execution mode.

15. The apparatus of claim 14, wherein the execution mechanism is configured to either ignore or de-assert the speculative-use indicator associated with an instance of a limited processor resource as the instance of the limited processor resource is subsequently used.

16. The apparatus of claim 11, wherein the execution mechanism is configured to assert only the speculative-use indicator for an instance of the limited processor resource associated with an instruction that caused the entry to speculative-execution, and not to assert the speculative-use indicator for other instances of the limited processor resource.

17. A computer system comprising:
an execution mechanism on a processor which supports speculative execution;
a memory coupled to the processor;
wherein the execution mechanism is configured to execute instructions for a program in program order during a normal-execution mode;
upon encountering a condition which causes the processor to enter a speculative-execution mode, the execution mechanism is configured to perform a checkpoint and commence execution of instructions in the speculative-execution mode;
upon encountering an instruction which requires the allocation of an instance of a limited processor resource during the execution of instructions in speculative-execution mode, the execution mechanism is configured to check a speculative-use indicator associated with each instance of the limited processor resource, wherein the speculative-use indicator is asserted for an instance of the limited processor resource when the instance of the limited processor resource is allocated during speculative execution;
upon finding that the speculative-use indicators are asserted for all instances of the limited processor resource which are available to be allocated for the instruction, the execution mechanism is configured to abort the instruction; and
otherwise, upon finding that the speculative-use indicator is deasserted for an instance of the limited processor resource which is available to be allocated for the instruction, the execution mechanism is configured to assert the speculative-use indicator associated with the instance and to execute the instruction.

18. The computer system of claim 17, wherein the limited processor resource includes at least one of:

a location for a cache line within a cache;

an entry for a branch prediction in a branch prediction table; or an entry in a translation look-aside buffer.

19. The computer system of claim 18, wherein the execution mechanism is configured to either ignore or de-assert the speculative-use indicator associated with an instance of a limited processor resource as the instance of the limited processor resource is subsequently used.

20. The computer system of claim 17, wherein the execution mechanism is configured to deassert the speculative-use indicators when the processor exits a speculative-execution mode.

21. The computer system of claim 17, wherein the execution mechanism is configured to deassert the speculative-use indicators when the processor enters a speculative-execution mode.

22. The computer system of claim 17, wherein the execution mechanism is configured to assert only the speculative-use indicator for an instance of the limited processor resource associated with an instruction that caused the entry to speculative-execution, and not to assert the speculative-use indicator for other instances of the limited processor resource.

* * * * *